(12) United States Patent
Celikyilmaz et al.

(10) Patent No.: US 9,886,958 B2
(45) Date of Patent: Feb. 6, 2018

(54) LANGUAGE AND DOMAIN INDEPENDENT MODEL BASED APPROACH FOR ON-SCREEN ITEM SELECTION

(71) Applicant: Microsoft Technology Licensing, LLC, Redmond, WA (US)

(72) Inventors: Fethiye Asli Celikyilmaz, Mountain View, CA (US); Zhaleh Feizollahi, Seattle, WA (US); Dilek Hakkani-Tur, Los Altos, CA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/966,257

(22) Filed: Dec. 11, 2015

(65) Prior Publication Data
US 2017/0169829 A1  Jun. 15, 2017

(51) Int. Cl.
*G10L 17/22* (2013.01)
*G10L 17/26* (2013.01)
*G10L 17/04* (2013.01)

(52) U.S. Cl.
CPC ............. *G10L 17/22* (2013.01); *G10L 17/04* (2013.01); *G10L 17/26* (2013.01)

(58) Field of Classification Search
CPC .................... G10L 2015/223; G10L 2015/228
See application file for complete search history.

(56) References Cited

U.S. PATENT DOCUMENTS

| | | |
|---|---|---|
| 6,085,160 A | 7/2000 | D'hoore et al. |
| 6,711,543 B2 | 3/2004 | Cameron |
| 6,757,718 B1 | 6/2004 | Halverson et al. |
| 7,167,826 B2 | 1/2007 | Cho |
| 7,742,911 B2 | 6/2010 | Chotimongkol et al. |
| 7,844,458 B2 | 11/2010 | Hirota et al. |
| 7,881,493 B1 | 2/2011 | Edwards et al. |
| 7,933,508 B2 | 4/2011 | Konicek |
| 8,112,275 B2 | 2/2012 | Kennewick et al. |

(Continued)

FOREIGN PATENT DOCUMENTS

| | | |
|---|---|---|
| EP | 2533242 | 12/2012 |
| WO | 97/08604 | 3/1997 |

(Continued)

OTHER PUBLICATIONS

U.S. Appl. No. 14/194,964, Amendment and Response filed Apr. 1, 2016, 13 pgs.

(Continued)

*Primary Examiner* — Douglas Godbold

(57) ABSTRACT

A universal model-based approach for item disambiguation and selection is provided. An utterance may be received by a computing device in response to a list of items for selection. In aspects, the list of items may be displayed on a display screen. The universal disambiguation model may then be applied to the utterance. The universal disambiguation model may be utilized to determine whether the utterance is directed to at least one of the list of items and identify an item from the list corresponding to the utterance, based on identified language and/or domain independent referential features. The computing device may then perform an action which may include selecting the identified item associated with utterance.

20 Claims, 11 Drawing Sheets

(56) References Cited

U.S. PATENT DOCUMENTS

| | | | |
|---|---|---|---|
| 8,224,656 | B2 | 7/2012 | Scholz et al. |
| 8,296,383 | B2 | 10/2012 | Lindahl |
| 8,375,326 | B2 | 2/2013 | Bucher et al. |
| 8,467,672 | B2 | 6/2013 | Konicek |
| 8,560,321 | B1 | 10/2013 | Yeracaris et al. |
| 8,571,851 | B1 | 10/2013 | Tickner et al. |
| 8,700,392 | B1 | 4/2014 | Hart et al. |
| 8,793,620 | B2 | 7/2014 | Stafford |
| 8,818,804 | B2 | 8/2014 | Jordan et al. |
| 8,977,555 | B2 | 3/2015 | Torok et al. |
| 9,043,206 | B2 | 5/2015 | Roberge |
| 9,129,591 | B2 * | 9/2015 | Sung ................. G10L 15/32 |
| 9,338,493 | B2 * | 5/2016 | Van Os ............... G10L 15/22 |
| 2002/0120455 | A1 | 8/2002 | Nakata |
| 2002/0135618 | A1 | 9/2002 | Maes et al. |
| 2003/0040914 | A1 | 2/2003 | Friedrich et al. |
| 2004/0088163 | A1* | 5/2004 | Schalkwyk ........ G10L 15/187 704/251 |
| 2010/0033333 | A1 | 2/2010 | Victor et al. |
| 2010/0312547 | A1 | 12/2010 | Van Os et al. |
| 2011/0029301 | A1 | 2/2011 | Han et al. |
| 2011/0054899 | A1 | 3/2011 | Phillips et al. |
| 2011/0066634 | A1* | 3/2011 | Phillips ............... G10L 15/22 707/769 |
| 2011/0276944 | A1 | 11/2011 | Bergman et al. |
| 2012/0209608 | A1 | 8/2012 | Lee |
| 2012/0253788 | A1 | 10/2012 | Heck et al. |
| 2012/0253823 | A1 | 10/2012 | Schalk et al. |
| 2012/0254227 | A1 | 10/2012 | Heck et al. |
| 2012/0259638 | A1 | 10/2012 | Kalini |
| 2012/0271617 | A1* | 10/2012 | Nakajima ........... G10L 15/183 704/2 |
| 2012/0295708 | A1 | 11/2012 | Hernandez-Abrego et al. |
| 2013/0030811 | A1 | 1/2013 | Olleon et al. |
| 2013/0187835 | A1 | 7/2013 | Vaught et al. |
| 2013/0304451 | A1 | 11/2013 | Sarikaya et al. |
| 2013/0304479 | A1 | 11/2013 | Teller et al. |
| 2013/0307771 | A1 | 11/2013 | Parker et al. |
| 2013/0346085 | A1 | 12/2013 | Stekkelpak |
| 2014/0099623 | A1 | 4/2014 | Amit et al. |
| 2014/0184550 | A1 | 7/2014 | Hennessey et al. |
| 2014/0196092 | A1 | 7/2014 | Chung |
| 2014/0309990 | A1* | 10/2014 | Gandrabur .......... G10L 15/1815 704/9 |
| 2014/0337740 | A1 | 11/2014 | Kwon et al. |
| 2015/0248886 | A1 | 9/2015 | Sarikaya et al. |
| 2016/0091967 | A1 | 3/2016 | Prokofieva et al. |

FOREIGN PATENT DOCUMENTS

| | | |
|---|---|---|
| WO | WO 0225637 | 3/2002 |
| WO | WO 2014057140 | 4/2014 |

OTHER PUBLICATIONS

U.S. Appl. No. 14/194,964, Notice of Allowance dated Apr. 8, 2016, 7 pgs.

U.S. Appl. No. 14/496,538, Amendment and Response filed Apr. 25, 2016, 20 pgs.

"Use Speech Recognition to click anywhere on the screen", Retrieved on: Oct. 6, 2015 Available at: http://windows.microsoft.com/en-SG/windows-vista/Use-Speech-Recognition-to-click-anywhere-on-the-screen?6416ca60, 2 pgs.

Kluwer, et al., "Using Syntactic and Semantic based Relations for Dialogue Act Recognition", In Proceedings of 23rd International Conference on Computational Linguistics, Aug. 2010, pp. 570-578.

Bolt, Richard A., "Put-that-there: Voice and Gesture at the Graphics Interface", In Proceedings of the 7th annual conference on Computer graphics and interactive techniques, Jul. 14, 1980, 9 pages.

Celikyilmaz, Asli, et al., "A Universal Model for Flexible Item Selection in Conversational Dialogs", Dec. 2015, 7 pgs.

Cooke, et al., "Exploiting a 'Gaze-Lombard Effect' to Improve ASR Performance in Acoustically Noisy Settings", In IEEE International Conference on Acoustics, Speech and Signal Processing, May 4, 2014, 5 pages.

Deng, et al., "Recent Advances in Deep Learning for Speech Research at Microsoft", In IEEE International Conference on Acoustics, Speech and Signal Processing, May 26, 2013, 5 pages.

Gorniak, et al., "Augmenting User Interfaces with Adaptive Speech Commands", In Proceedings of International Conference on Multimodal Interfaces, Nov. 5, 2005, 4 pages.

Griffin, et al., "What the Eyes Say about Speaking", In Proceedings of Psychological Science, vol. 11, No. 04, Jul. 2000, 6 pages.

Griffin, Zenzi M., "Gaze Durations during Speech Reflect Word Selection and Phonological Encoding", In Proceedings of Cognition, vol. 82, No. 1, Nov. 2001, 14 pages.

Heck, et al., "Multi-Modal Conversational Search and Browse", In Proceedings of the First Workshop on Speech, Language and Audio in Multimedia, Aug. 22, 2013, 6 pages.

Hui, et al., "Cross-Modality Semantic Integration With Hypothesis Rescoring for Robust Interpretation of Multimodal User Interactions", IEEE Transactions on Audio, Speech and Language Processing, vol. 17, Issue 3, Mar. 2009, pp. 486-500.

Icsiboost, Retrieved on: Sep. 9, 2014, Available at: https://code.google.com/p/icsiboost, 2 pgs.

Kaur, et al., "Where is it? Event Synchronization in Gaze-Speech Input Systems", In Proceedings of the 5th international conference on Multimodal interfaces, Nov. 5, 2003, 8 pages.

Kennington, et al., "Interpreting Situated Dialogue Utterances: An Update Model that Uses Speech, Gaze, and Gesture Information", In Proceedings of 14th Annual SIGdial Meeting on Discourse and Dialogue, Aug. 22, 2013, 10 pages.

Kulkarni, et al., "Mutual Disambiguation of Eye Gaze and Speech for Sight Translation and Reading", In Proceedings of the 6th Workshop on Eye Gaze in Intelligent Human Machine Interaction, Dec. 13, 2013, 6 pages.

Latif, et al., "Teleoperation through Eye Gaze (TeleGaze): A Multimodal Approach", In IEEE International Conference on Robotics and Biomimetics, Dec. 19, 2009, 6 pages.

Misu, et al., "Situated Multi-Modal Dialog System in Vehicles", In Proceedings of the 6th workshop on Eye gaze in intelligent human machine interaction: gaze in multimodal interaction, Dec. 13, 2013, 3 pages.

PCT International Search Report and Written Opinion Issued in PCT Patent Application No. PCT/US2015/017874, dated Jul. 7, 2015, 11 Pages.

Prasov, et al., "Eye Gaze for Attention Prediction in Multimodal Human-Machine Conversation", In Technical Report SS-07-04, Mar. 26, 2007, 9 pages.

Prasov, et al., "Fusing Eye Gaze with Speech Recognition Hypotheses to Resolve Exophoric References in Situated Dialogue", In Proceedings of the Conference on Empirical Methods in Natural Language Processing, Oct. 9, 2010, 11 Pages.

Prasov, et al., "What's in a gaze?: the role of eye-gaze in reference resolution in multimodal conversational interfaces", In Proceedings of the 8 International Conference on Intelligent User Interfaces, Jan. 13, 2008, 10 pages.

Qu, et al., "The Role of Interactivity in Human-Machine Conversation for Automatic Word Acquisition", In the Proceedings of 10th Annual Meeting of the Special Interest Group in Discourse and Dialogue, Sep. 2009, 8 pages.

Qvarfordt, et al., "Conversing with the User Based on Eye-Gaze Patterns", In Proceedings of the SIGCHI Conference on Human Factors in Computing Systems, Apr. 2, 2005, 10 pages.

Qvarfordt, et al., "Realtourist—A Study of Augmenting Human-Human and Human-Computer Dialogue with Eye-Gaze Overlay", In International Conference on Human-Computer Interaction, Sep. 12, 2005, 14 pages.

Salvucci, et al., "Identifying Fixations and Saccades in Eye-Tracking protocols", In Proceedings of symposium on Eye tracking research & applications, Nov. 8, 2000, 8 pages.

Slaney, et al., "Gaze-Enhanced Speech Recognition", In IEEE International Conference on Acoustics, Speech and Signal Processing, May 4, 2014, 5 pgs.

(56) References Cited

OTHER PUBLICATIONS

Tan, et al., "Eye Gaze and Speech for Data Entry: A Comparison of Different Data Entry Methods", In International Conference on Multimedia and Expo, Jul. 6, 2003, 4 pages.
U.S. Appl. No. 14/194,964, Amendment and Response filed Oct. 29, 2015, 17 pgs.
U.S. Appl. No. 14/194,964, Office Action dated Jan. 13, 2016, 15 pgs.
U.S. Appl. No. 14/194,964, Office Action dated Aug. 21, 2015, 15 pgs.
Vosoughi, Soroush, "Improving Automatic Speech Recognition Through Head Pose Driven Visual Grounding", Published on: Apr. 26, 2014, Available at: http://www.media.mit.edu/cogmac/publications/CHI2014_vosoughi.pdf, 4 pgs.
Zhang, et al., "Designing a Robust Speech and Gaze Multimodal System for Diverse Users", In IEEE International Conference on Information Reuse and Integration, Oct. 27, 2003, 8 pages.
Chen, et al., "Probabilistic Gaze Estimation Without Active Personal Calibration", Dept of Electrical, Computer and System Engineering Rensselaer Polytechnic Institute, 8 pages.
PCT International Search Report and Written Opinion for PCT Application No. PCT/US2015/052194, dated Nov. 9, 2015, 13 pages.
PCT 2nd Written Opinion Issued in PCT Patent Application No. PCT/US2015/017874, dated Feb. 12, 2016, 8 pgs.
U.S. Appl. No. 14/496,538, Office Action dated Feb. 18, 2016, 29 pgs.
PCT International Preliminary Report on Patentability in International Application No. PCT/US2015/017874, dated Jun. 27, 2016, 8 pgs.
U.S. Appl. No. 14/496,538, Office Action dated Aug. 12, 2016, 38 pgs.
U.S. Appl. No. 14/496,538, Amendment and Response filed Sep. 30, 2016, 18 pgs.
PCT 2nd Written Opinion for PCT Application No. PCT/US2015/052194, dated Aug. 5, 2016, 6 pages.
U.S. Appl. No. 14/496,538, Office Action dated Nov. 4, 2016, 42 pgs.
U.S. Appl. No. 14/496,538, Amendment and Response filed Dec. 29, 2016, 18 pgs.
PCT International Preliminary Report on Patentability in International Application No. PCT/US2015/052194, dated Dec. 7, 2016, 7 pages.
U.S. Appl. No. 14/496,538, Office Action dated Apr. 21, 2017, 39 pgs.
PCT International Search Report and Written Opinion in International Application PCT/US2016/063739, dated Apr. 28, 2017, 15 pgs.
U.S. Appl. No. 14/496,538, Appeal Brief filed Sep. 20, 2017, 29 pgs.

\* cited by examiner

LANGUAGE AND DOMAIN INDEPENDENT MODEL BASED APPROACH FOR ON-SCREEN ITEM SELECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Machine learning, language understanding, and artificial intelligence are changing the way users interact with the computers. Developers of computers and applications are always trying to improve the interactions between humans and computers. However, development of language understanding and selection models for any given language often require a significant amount of time, money, and other resources to accomplish.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for providing or generating a language and/or domain independent model based approach for on-screen item selection and disambiguation. An utterance in a first language may be received by a computing device in response to displaying items on a display. A language and/or domain independent disambiguation model may then be applied to the utterance by the computing device. The universal disambiguation model may be utilized even if the universal model has not been trained in the same language or received minimal training data in the same language as the utterance. The universal disambiguation model may identify whether the utterance is directed to at least one of the items on the display and then, may identify if an item among the displayed items corresponds to the utterance, based on language and/or domain independent features selected from extracted referential features of the utterance. The computing device may then perform an action associated with the utterance upon identifying the item corresponding to the utterance on the display. Accordingly, the language and/or domain independent model of the systems and method disclosed herein is scalable to new languages with minimal costs and development time. More specifically, the language and/or domain independent model of the systems and methods disclosed herein provide for improved efficiency and scalability by making it universal or applicable to any given language. Therefore, the language and/or domain independent model of the systems and methods disclosed herein are easier to develop and/or scale and are more efficient when compared to a natural user interface or disambiguation models that are not designed to be language and/or domain independent.

One aspect of the disclosure includes a language understanding system. The language understanding system comprises a language understanding server. The language understanding server includes a processor and memory. The processor executes instructions stored on the memory to perform a method. The method includes retrieving training features from a plurality of feature extractors and estimating model parameters based on a training algorithm that utilizes the training features from different feature extractors to form a trained language understanding model. In some aspects, the plurality of feature extractors (e.g., domain predictor, intent predictor, entity predictor, etc.) may be located on the same server as the language understanding system. In other aspects, the plurality of feature extractors may be located on one or more different servers in communication with the language understanding system.

Another aspect of the disclosure is directed to a method for training and using a natural language understanding system. The method comprises training a language understanding model of a language understanding system. The training of the language understanding model comprises receiving, e.g., at a language understanding server, training features from a plurality of feature extractors and estimating model parameters based on a training algorithm that utilizes the training features from the different feature extractors to form a trained language understanding model. In some aspects, the plurality of feature extractors (e.g., domain predictor, intent predictor, entity predictor, etc.) may be located on the language understanding server. In other aspects, the plurality of feature extractors may be located on one or more different servers in communication with the language understanding server.

Yet another aspect of the disclosure includes a system. The system comprises at least one processor and a memory. The memory includes computer-executable instructions stored thereon. The computer-executable instructions are executed by the at least one processor. The computer-executable instructions cause the system to perform operations, the operations comprising receiving a natural language input from a client device on a natural language server, sending the natural language input to a first feature extractor (e.g., an intent predictor), sending the natural language input to a second feature extractor (e.g., a domain predictor), and sending the natural language input to a third feature extractor (e.g., an entity predictor). In some aspects, the one or more feature extractors (e.g., the first, second, and third feature extractors) may be located on one or more remote servers in communication with the natural language server. In other aspects, the one or more feature extractors may be located on the natural language server.

With regard to the aspect described above, the computer-executable instructions cause the system to perform further operations, the operations comprising receiving a first set of potential features for the natural language input from the first feature extractor, receiving a second set of potential features for the natural language input from the second feature extractor, and receiving a third set of potential features for the natural language input from the third feature extractor. The computer-executable instructions cause the system to perform additional operations, the operations comprising aggregating the first set of potential features, the second set of potential features, and the third set of potential features to form an aggregated set of potential features and evaluating the aggregated set of potential features utilizing a language understanding model trained with training features from the first feature extractor, the second feature extractor, and the third feature extractor. The computer-executable instructions cause the system to perform further operations, the operations comprising determining a user intent, a domain, and entities (or slots) and associated confidence scores based on evaluating the aggregated set of potential features and generating a response based on the user intent, the domain, and the entities and the associated confidence scores.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

These and other features and advantages will be apparent from a reading of the following detailed description and a review of the associated drawings. It is to be understood that both the foregoing general description and the following detailed description are illustrative only and are not restrictive of the claims.

BRIEF DESCRIPTION OF THE DRAWINGS

Non-limiting and non-exhaustive examples or aspects are described with reference to the following Figures.

DETAILED DESCRIPTION

Figure 1:
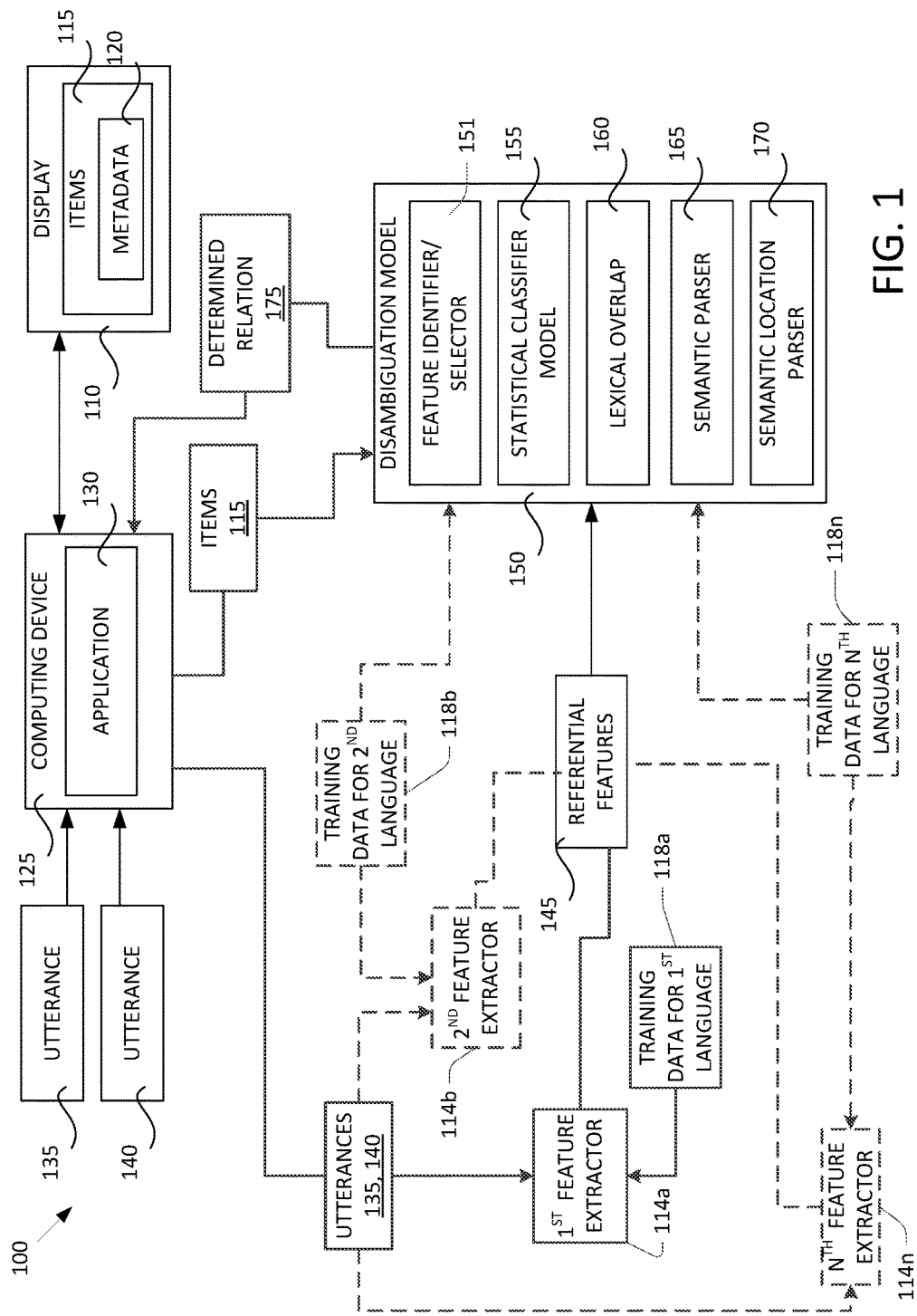
FIG. 1 is a block diagram illustrating a system which utilizes a universal model based approach for on-screen item selection and disambiguation, in accordance with aspects of the disclosure.

Progress in machine learning, language understanding and artificial intelligence are changing the way users interact with computers. Digital assistant applications, such as SIRI, GOOGLE Now and CORTANA are examples of the shift in human computer interaction. A natural language understanding (NLU) system is responsible for extracting semantic frames to represent the natural language input's domain, intents, and semantic slots (or entities). The NLU system utilizes NLU models that are usually trained from domain and language specific inputs or data with semantic annotation. Various features, such as word N-gram, dictionaries, personalization, etc., from feature extractors are used to build NLU models. The same set of features from the feature extractors utilized to the train the NLU model are also extracted at run time for semantic decoding of a received user utterance after the NLU has been trained.

Human-computer interaction in statistical natural language understanding has changed with the addition of a visual display screen, as visual rendering is utilized to communicate the dialog system's or an application's response. On-screen item identification and resolution when interpreting user utterances is one critical problem to achieve natural and accurate human-machine communication. A disambiguation model has been designed to correctly identify on-screen items from user utterances. The disambiguation model is utilized for identifying whether the utterance is directed to at least one of the items on the display by utilizing referential features extracted from the utterance by the NLU system and identifying an item among the displayed items corresponding to the utterance based on extracted referential features. The computing device may then perform an action associated with the utterance upon identifying the item corresponding to the utterance on the display. The combination of an NLU system and a disambiguation model provide for a natural user interface (NUI), enabling a more natural user interaction for the user.

As NUIs become main stream, scaling NUIs and disambiguation models to different languages has created new and challenging problems. Traditionally, both the NLU system and the disambiguation model were required to be trained with annotated data in the language and/or domain of the received utterances. Moreover, the previously utilized systems and methods required that the disambiguation model be trained with the same amount of training data as utilized by the NLU system. Accordingly, the training of the disambiguation model is often time and cost prohibitive, which has impeded the scalability of the disambiguation model and/or NUI to new languages. Additionally, each new domain and/or language requires additional memory and storage, making it harder to scale the disambiguation model and/or the NUI to more languages and domains as more languages and domains are added.

There is typically no system or method that allows for a universal (also referred to herein as a language and/or domain independent) disambiguation model. The systems and methods disclosed herein provide for a universal disambiguation model. The universal disambiguation model is language and/or domain independent because the universal disambiguation model identifies language and/or domain independent features extracted from an utterance and utilizes these features to determine if an utterance is related to a displayed item. As a result, the systems and methods as disclosed herein provide a universal disambiguation module that can be applied to any language with minimal to no training in that language and with a minimal loss of accuracy. Further, the universal disambiguation model is easily scalable to new languages with minimal cost and development time. Accordingly, the systems and methods disclosed herein improve the disambiguation model's development, efficiency, and scalability by making it universal or applicable to any given language.

Therefore, the systems and methods disclosed herein provide for NUIs or disambiguation models that are applicable to more languages and are more efficient when compared to NUIs or disambiguation models that are not designed to be universal. For example, the processing time for responding to a received utterance may be decreased based on the increased available memory (freed by the reduced need for training data by the disambiguation model). Further, the systems and methods described herein allow the disambiguation model to receive features from one or more different NLU systems trained in different languages without the disambiguation model having to be trained or only minimally trained in these different languages. As such, the NUI and the disambiguation model are easier to scale or apply to new language when compared to disambiguation models that are not designed to be universal.

In the following detailed description, references are made to the accompanying drawings that form a part hereof, and in which are shown by way of illustrations specific embodiments or examples. These embodiments or examples may be combined, other embodiments or examples may be utilized, and structural changes may be made without departing from the spirit or scope of the present disclosure. The following detailed description is therefore not to be taken in a limiting sense, and the scope of the present disclosure is defined by the appended claims and their equivalents.

Referring now to the drawings, in which like numerals represent like elements through the several figures, various aspects of the present disclosure will be described. FIG. 1 is a block diagram illustrating a universal system 100 which utilizes a model based approach for on-screen item selection and disambiguation, in accordance with an aspect of the disclosure. The system 100, which may comprise a conversational dialog system, includes a computing device 125 which is in communication with a display 110 (it should be understood that the display 110 may be integrated with the computing device 125 or comprise a separate device connected to the computing device 125, in accordance with various aspects of the disclosure). The computing device 125 may comprise, without limitation, a laptop computer, a smartphone, a video game console, a television, a mobile telephone, a smart phone, a tablet, a smart watch, a wearable computer, a personal computer, a desktop computer, and/or a gaming system. The computing device 125 may also comprise or be in communication with one or more recording devices (not shown) used to detect speech and receive video/pictures (e.g., MICROSOFT KINECT, microphone(s), and the like).

The computing device 125 may store an application 130 which, as will be described in greater detail below, may be configured to receive utterances 135 and 140 from a user in the form of natural language queries to select items 115 which may be shown on the display 110. The utterances 135 and 140 may be in the same language or in different languages. In some aspects, the application 130 may be executed in association with an operating system such as the WINDOWS PHONE and XBOX OS operating systems from MICROSOFT CORPORATION of Redmond Wash. It should be understood, however, that other operating systems and applications (including those from other manufacturers) may alternatively be utilized in accordance with the various aspects described herein.

Each of the items 115 may further comprise metadata 120 which may include additional item data such as text descriptions (e.g., a synopsis of a movie item, year of publication, actors, genre, etc.). For example, the application 130 may be configured to display a user interface for querying a list of movies based on a common character (e.g., "HARRY POTTER" movies) or a list of restaurants based in a particular area of a city or town (e.g., restaurants located in northeast Bellevue, Wash.), and then making a desired selection therefrom. Utterances comprising natural language queries for other items corresponding to other categories (e.g., a contacts list, music, television programs, etc.) may also be received and displayed utilizing the application 130.

In some aspects, the computing device 125 may include or be integrated with one or more feature extractors 114 and/or a universal disambiguation model 150 (also known as a "selection model"). In other aspects, the computing device 125 communicates with the one or more feature extractors 114 and/or the universal disambiguation model 150 separate from the computing device 125 via a network. In some aspects, the one or more feature extractors 114 and/or the universal disambiguation model 150 are part of application 130. In other aspects, the application 130 communicates with the one or more separate feature extractors 114 and/or a universal disambiguation model 150.

As will further be described in greater detail below, the application 130 may be configured to generate, utilize/communicate with a universal disambiguation model 150. The universal disambiguation model 150 receives the displayed items 115 including their metadata 120 from the application 130 and/or the computing device 125. Additionally, the universal disambiguation model 150 receives or obtains referential features 145 (which may include explicit descriptive references, implicit descriptive references, explicit spatial or positional references and implicit spatial or positional references) associated with utterance 140. The referential features 145 are received or obtained from the one or more feature extractors 114.

Each feature extractor 114 may be trained for a specific domain and/or language. For example, the first feature extractor 114a may be trained utilizing first training data 118a, such as annotated English data that is associated with the domain of the United States or annotated Italian data that is associated with domain of Italy. In another example, the second feature extractor 114b may be trained utilizing second training data 118b, such as annotated Spanish data that is associated with the domain of Mexico or annotated French data that is associated with the domain of France. However, any number of feature extractors 114n utilizing training data for any number of languages or domains 118n may be utilized by the system 100. The feature extractors 114 are any NLU system or spoken language understanding system that is capable of extracting referential features 145 from a user utterance or query. In some aspects, the feature extractor is trained utilizing annotated data from the same language as the utterance. In other aspects, the feature extractor is trained utilizing annotated data from a language that is different than the utterance.

As discussed above, the feature extractors 114 may extract semantic frames to represent the natural language input's domain, intents, and semantic slots (or entities). The feature extractors 114 may extract various features 145, such as word N-gram, dictionaries, personalization, etc. The feature extractors 114 send these referential features 145 for the utterance to the universal disambiguation model 150. Accordingly, the referential features 145 (which may include explicit descriptive references, implicit descriptive references, explicit spatial or positional references and implicit spatial or positional references) associated with utterance 135 or140 may include domain and/or language specific features and domain and/or language independent features. For example, n-gram features are language dependent features. In some aspects, language independent features refer to features that are mostly derived from semantic space (e.g., the existence of a slot tag but not the actual words tagged), the position of the item, and/or positional references (e.g., "first one"). For example the value of a feature is language and domain dependent, while the existence of the feature is not. For example, the existence of the word "football" is not dependent on the domain or the language utilized to say this word. However, the value of the word "football" and whether it refers to soccer or American football is dependent on the language (e.g. English U.S. or English U.K.) and the domain (United States or United Kingdom) utilized to interpret the value of this word. As such, some of the features generated by a feature extractor 114 are language and/or domain dependent. While other features generated by a feature extractor 114 are language and/or domain independent. In some aspects the feature extractor 114 is a separate and different component from the universal disambiguation model 150. In other aspects, the feature extractor 114 is part of or an integrated component of the universal disambiguation model 150.

The universal disambiguation model 150 may include a feature identifier/selector 151. The universal disambiguation model 150 may further include various sub-models and program modules, including statistical classifier model 155, lexical overlap module 160, semantic parser 165, and/or semantic location parser 170. The universal disambiguation model 150 may utilize the feature identifier/selector 151 to identify and/or select features from the one or more feature extractors 114 that are langue and/or domain independent. The universal disambiguation model 150 may utilize one or more of the aforementioned sub-models and program modules to determine if there is a relationship between a displayed item 115 and the utterance 140 based on the selected universal features (also referred to herein as domain and/or language independent features) so that the universal disambiguation model 150 may correctly identify utterances directed to the display 110 of the computing device 125 and choose the correct item in response to a user query.

In some aspects, the universal disambiguation model 150 sends the determined relationship 175 between the utterance and the one or more displayed items 115 to the application 130 and/or computing device 125. In these aspects, the application 130 and/or computing device 125 determine an action to take based on the determined relationship or association 175. In other aspects, the universal disambiguation model 150 sends the determined relationship 175 between the utterance and the one or more displayed items 115 and a determined action to the application 130 and/or computing device 125 for performance.

In some aspects, the universal disambiguation model 150 has not been trained with any training data in the language of the utterance. In an example, as illustrated in FIG. 1, utterance 135 is provided in a first language and the universal disambiguation model 150 has received no training data 118a from this first language. However, the universal disambiguation model 150 by utilizing universal features is able to determine an on-screen item selection from the utterance 135 with an absolute loss of accuracy of 5% or less when compared to disambiguation models fully trained in the same language of the utterance. Further, the universal disambiguation model 150 by utilizing universal features is able to determine an on-screen item selection from the utterance 135 in a language in which the universal disambiguation model 150 has no training with an accuracy of 85%-95%. As such, the universal disambiguation model 150 can be effectively utilized on utterances in languages and/or domains that the universal disambiguation model 150 has not been trained in.

Further, the universal disambiguation model 150 may increase its accuracy with minimal amounts of training data in the same language of the utterance. For example, when the universal disambiguation model 150 receives 20% to 30% of randomly selected training data for a given language in comparison to the language understanding model, the universal disambiguation model 150 may have only a 2% or less loss in accuracy when compared to disambiguation models fully trained in that language of the utterance. In another example, when the universal disambiguation model 150 receives 10% to 20% of randomly selected training data for a given language in comparison to the language understanding model, the universal disambiguation model 150 may have only a 3% or less loss in accuracy when compared to disambiguation models fully trained in that language of the utterance.

Accordingly, the system 100 is easily scalable to new languages with minimal costs and development time. Further, system 100 improves a disambiguation model's development, efficiency, and scalability by making it universal or applicable to any given language. Therefore, system 100 provides for an NUI or a disambiguation model that is applicable to more languages and is more efficient when compared to NUIs or disambiguation models that are not designed to be universal.

Figure 2A:
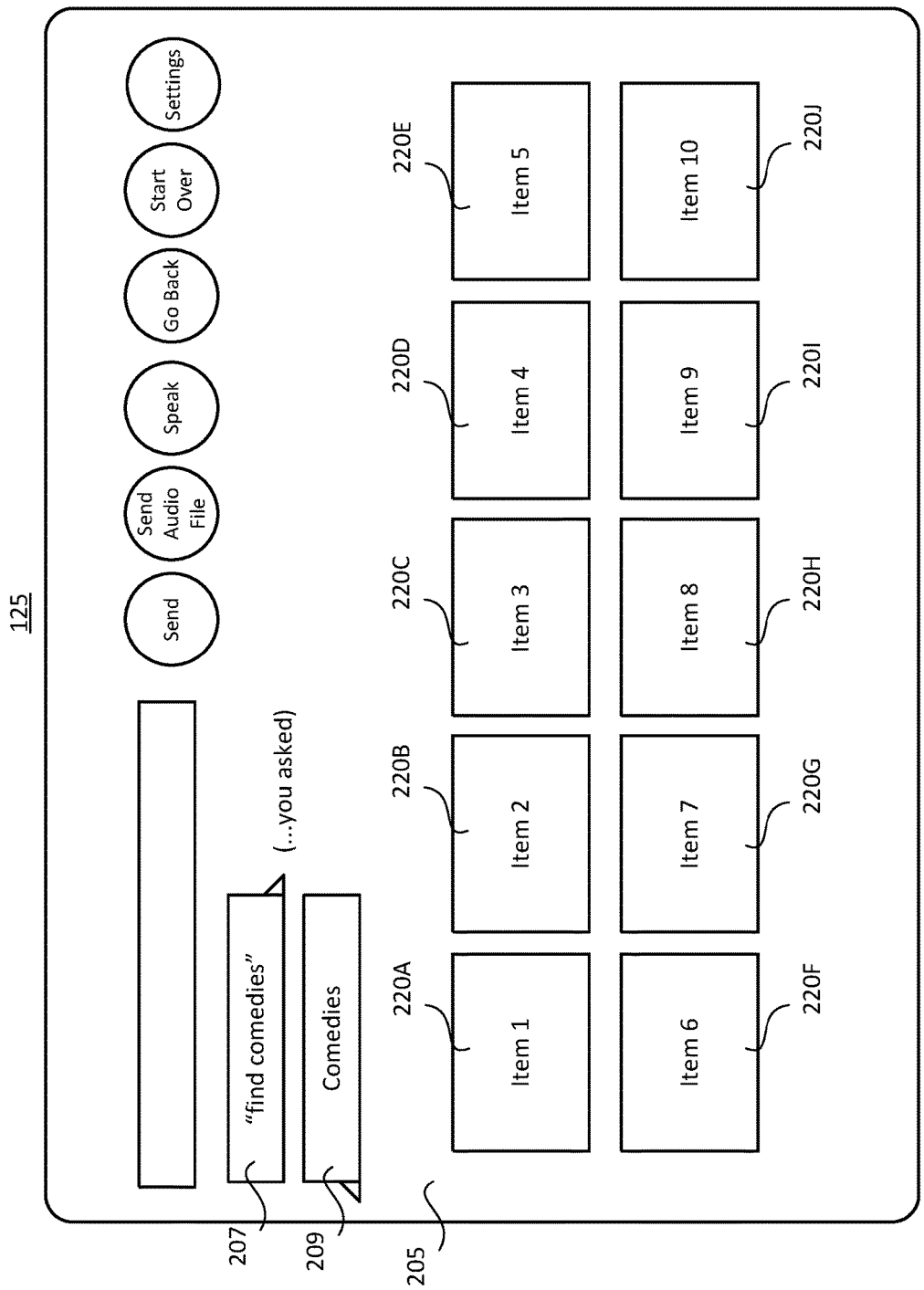
FIG. 2A shows a screen display of a computing device which includes a user interface for utilizing a universal model based approach for on-screen item selection and disambiguation, in accordance with aspects of the disclosure.

FIG. 2A shows a screen display of the computing device 125, which includes a user interface 205 for utilizing a universal model based approach for on-screen item disambiguation and selection, in accordance with an aspect of the present disclosure. The user interface 205, which may be generated by the application 130 on the display 110, may be configured for a user to interact with the computing device 125 to complete several tasks such as browsing, searching, filtering, etc. The user interface 205 may include a first turn or first utterance 207 and a recognition result 209. The first turn utterance 207 may comprise a query posed by a user for a list of items (e.g., "find comedies"), after which the application 130 may return a list of items 220A-220J for the user to choose from, which are shown on the display 110. As discussed above with respect to FIG. 1, each of the items 220A-220J may include accompanying text (e.g., titles of movie comedies) in addition to metadata (not shown to the user) which may include additional information about each item.

Figure 2B:
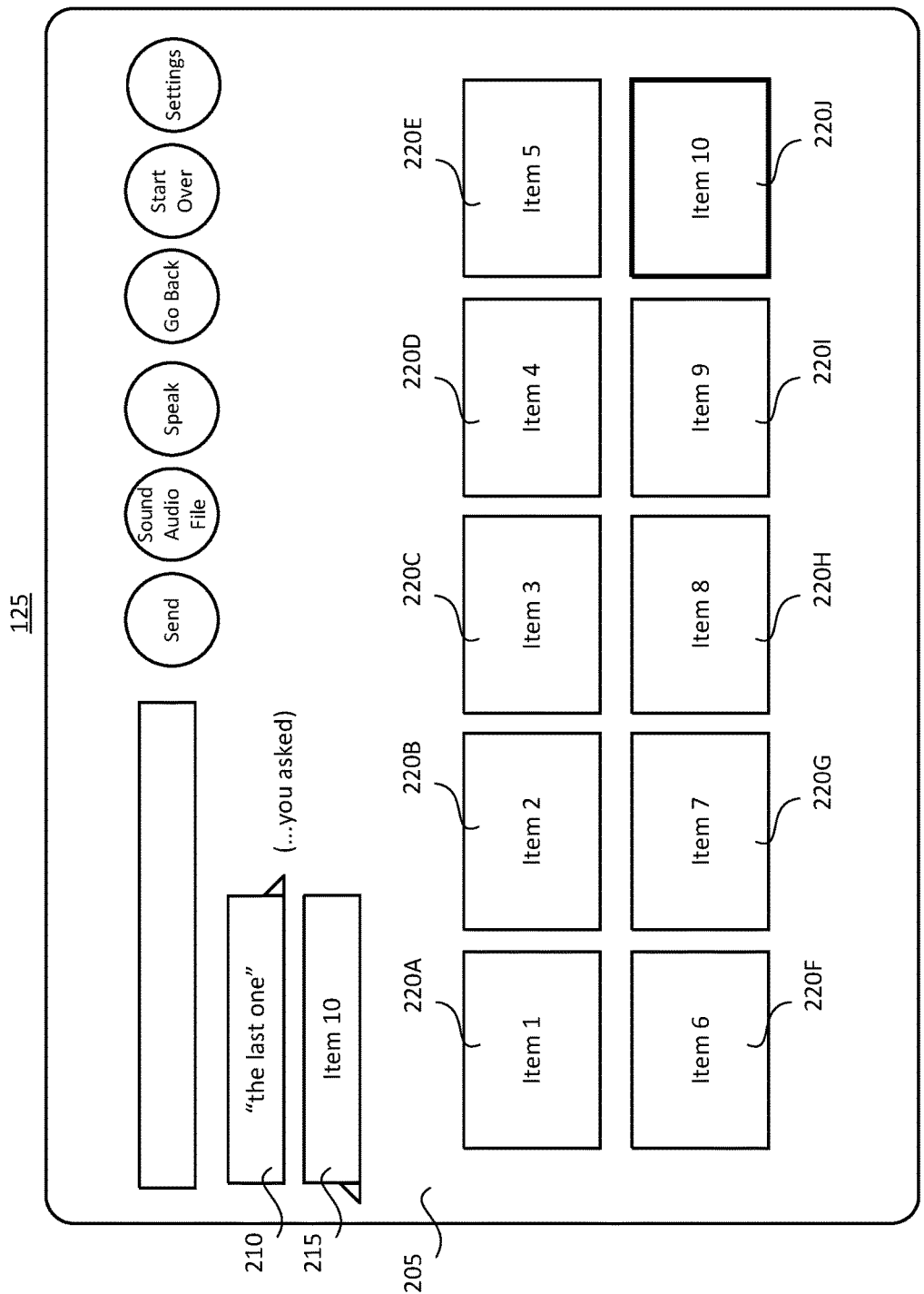
FIG. 2B shows a screen display of a computing device which includes a user interface for utilizing a universal model based approach for on-screen item selection and disambiguation, in accordance with aspects of the disclosure.

FIG. 2B shows a screen display of the computing device 125, which includes the user interface 205 for utilizing a universal model based approach for on-screen item disambiguation and selection, in accordance with an aspect of the disclosure. The user interface 205, which may be generated by the application 130 after displaying the items 220A-220J in response to receiving the first utterance 207 (as shown in FIG. 2A), may include a second turn or second utterance 210 and a recognition result 215. As will be discussed in greater detail below with respect to FIGS. 4-5, the recognition result 215 may be determined by applying the universal disambiguation model 150 to the second utterance 210 in order to identify the correct item requested by the user (e.g., the "last one") from among the displayed items 220A-220J (e.g., "Item 10"). Once an item has been identified, the item may then be highlighted (such as shown surrounding the item 220J) for selection or other action by the user.

Figure 3:
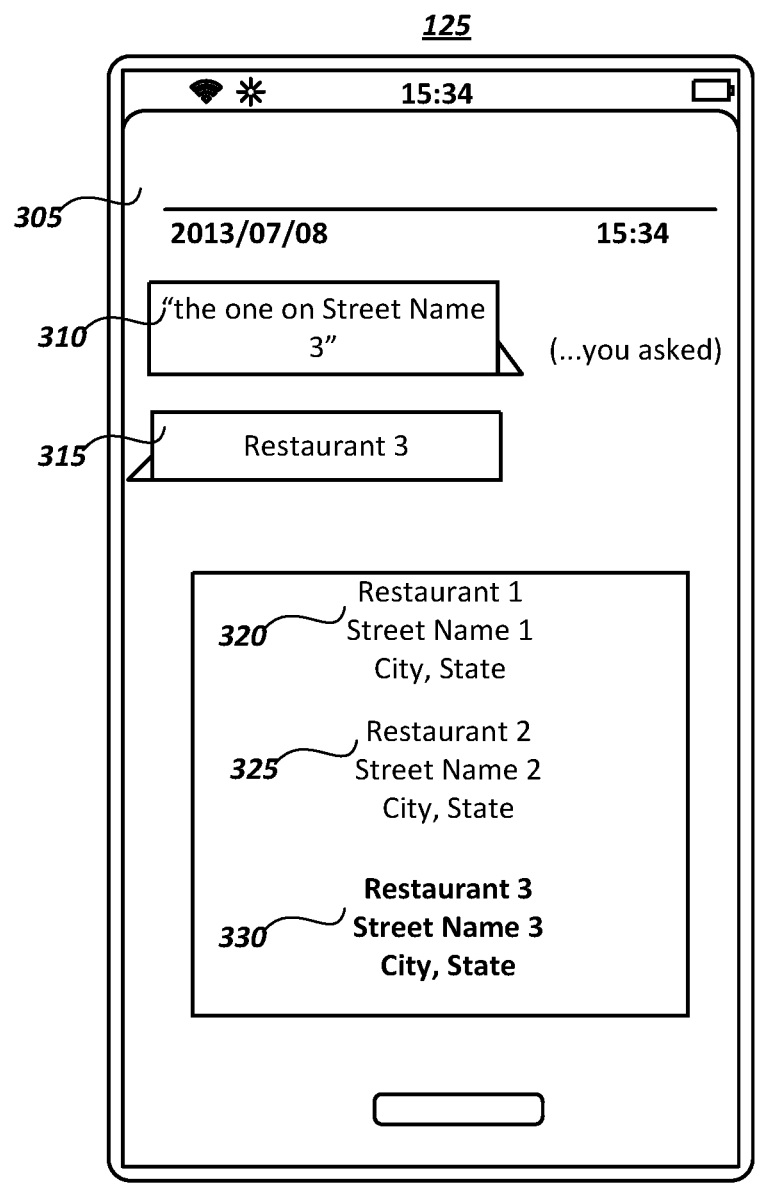
FIG. 3 shows a screen display of a computing device which includes a user interface for utilizing a universal model based approach for on-screen item selection and disambiguation, in accordance with aspects of the disclosure.

FIG. 3 shows a screen display of the computing device 125 which includes a user interface 305 for utilizing a universal model based approach for on-screen item disambiguation and selection, in accordance with another aspect of the disclosure. The user interface 305, which may be generated by the application 130 on the display 110, may be configured for a user to interact with the computing device 125 to complete several tasks such as browsing, searching, filtering, etc. The user interface 305 may include an utterance 310 and a recognition result 315. As will be discussed in greater detail below with respect to FIGS. 4-5, the recognition result 315 may be determined by applying the universal disambiguation model 150 (also known as a "selection model") to the utterance 310 in order to identify the correct item requested by the user (e.g., "the one on Street Name 3") from among displayed items 320-330. Once an item has been identified, the item may then be highlighted (such as shown applied to the item 330) for selection or other action by the user.

Figure 4:
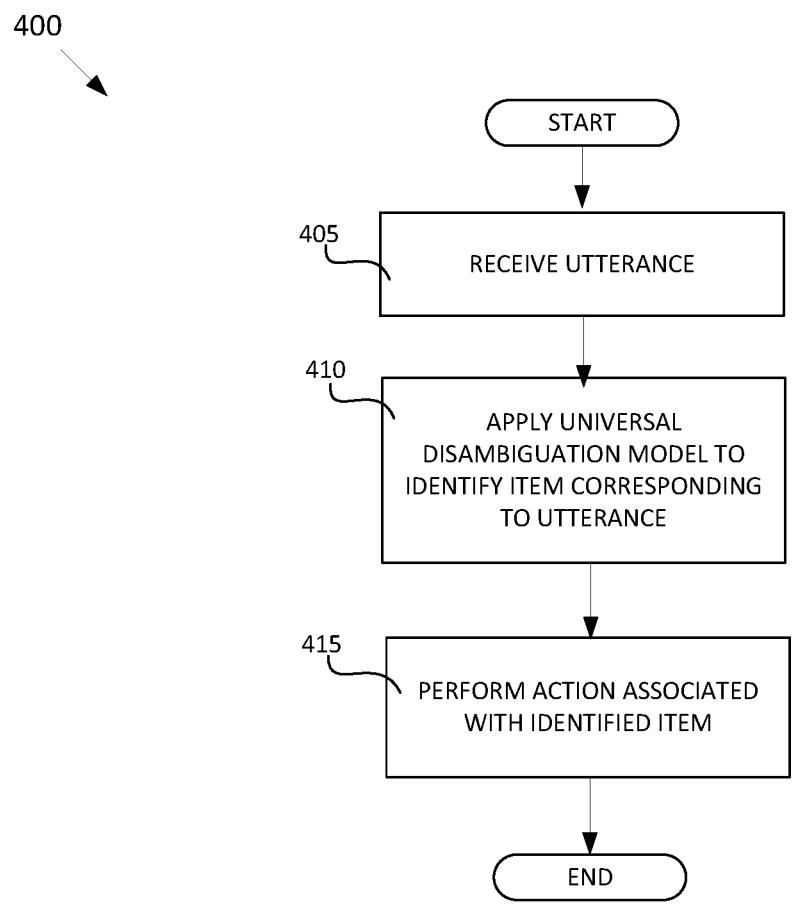
FIG. 4 is a flow diagram illustrating a routine for utilizing a universal model based approach for on-screen item selection and disambiguation, in accordance with aspects of the disclosure.

FIG. 4 is a flow diagram illustrating a routine 400 utilizing a universal disambiguation model (also known as a "selection model") based approach for item disambiguation and selection, in accordance with an aspect of the disclosure. In some aspects, a universal disambiguation model may be utilized to identify and select an item of a plurality of items presented on a display. In other aspects, the universal disambiguation model may be utilized to identify and select an item of a plurality of items presented to the user via an alternative medium, e.g., audio interface, tactile interface (e.g., braille), etc. In still other aspects, the universal disambiguation model may be utilized to identify and select an item of a plurality of items in a store of items.

When reading the discussion of the routines presented herein, it should be appreciated that the logical operations of various aspects of the present disclosure are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the disclosure. Accordingly, the logical operations illustrated in FIGS. 4-5 and making up the various aspects described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present disclosure as recited within the claims set forth herein. Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The routine 400 begins at operation 405, where the application 130 executing on the computing device 125, may receive an utterance (from a user). In some aspects, the utterance may be in response to a display of a plurality of items on the display 110. In other aspects, the utterance may be in response to a presentation of a plurality of items via another medium, e.g., audio, tactile (e.g., braille), etc. In still other aspects, the utterance may be made sua sponte, e.g., without prompting by a presentation of items. The utterance may be in a first language.

From operation 405, the routine 400 continues to operation 410, where the application 130 executing on the computing device 125, may apply the universal disambiguation model 150 to identify (or determine) an item corresponding to the utterance received at operation 405. It should be understood that in accordance with one aspect, a single universal model (e.g., the universal disambiguation model 150 or selection model) may be utilized to implement a multi-stage process. For instance, when the utterance is in response to a plurality of items on a display, the universal model may: (1) identify whether the user is referring to an item on the display 110 and, if so, (2) determine which item the user is referring and, in some aspects, (3) select the item. In accordance with an alternative aspect, multiple models (e.g., separate models) may be utilized to implement the aforementioned multi-stage process. For example, a first model may be utilized to determine whether the user is referring to an item on a display 110 and a second model may be utilized to determine or identify which item the user is referring (e.g., disambiguate the item) and, in some aspects, select the identified item for an action. Illustrative operations performed by the universal disambiguation model 150 for identifying an item corresponding to the utterance will be described in more detail below with respect to FIG. 5.

From operation 410, the routine 400 continues to operation 415, where the application 130 executing on the computing device 125, may perform an action (or actions) associated with the item identified by the universal disambiguation model 150. For example, in some aspects, the action may include a user selection of a disambiguated item of a plurality of items on a display 110 for viewing additional information about the selected item (e.g., additional information about a selected movie title). In other aspects, an action may include a user selection of a disambiguated item on the display and execution of an activity associated with the selected item. The activity may include, for example, playing a selected movie, displaying directions to a selected restaurant location, generating an e-mail to a selected contact from a contacts list, etc. From operation 415, the routine 400 then ends.

Figure 5:
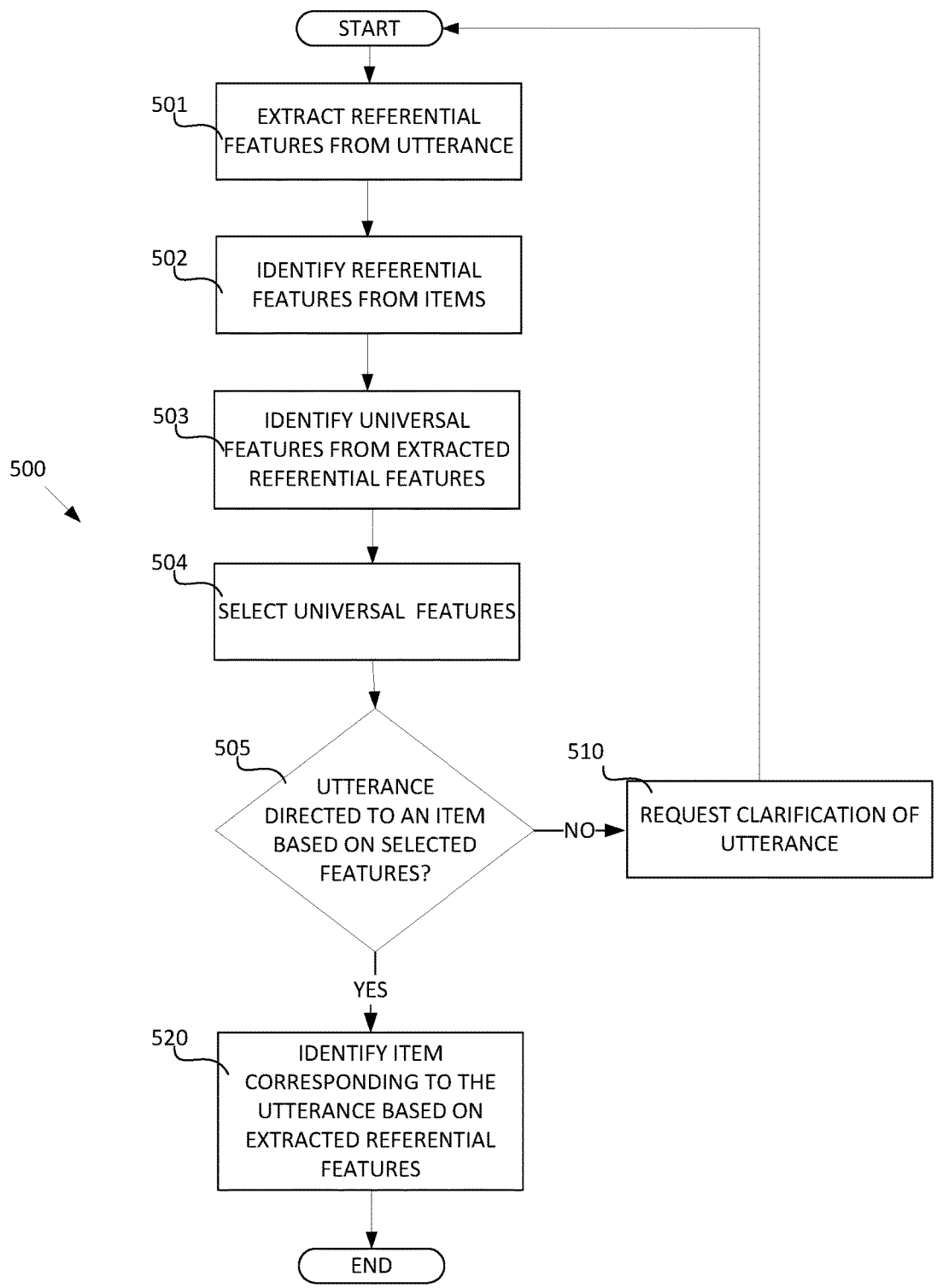
FIG. 5 is a flow diagram illustrating a routine for utilizing a universal model based approach for on-screen item selection and disambiguation, in accordance with aspects of the disclosure.

FIG. 5 is a flow diagram illustrating a routine 500 utilizing a universal model based approach for item disambiguation and selection, in accordance with an aspect of the disclosure. As provided above, in some aspects, a universal disambiguation model may be utilized to identify and select an item of a plurality of items presented on a display. In other aspects, the universal disambiguation model may be utilized to identify and select an item of a plurality of items presented to a user via an alternative medium, e.g., audio, tactile (e.g., braille), etc. In still other aspects, the universal disambiguation model may be utilized to identify and select an item of a plurality of items in a store of items.

The routine 500 begins at operation 501, where referential features are extracted from an utterance in a first language. In some aspects, one or more feature extractors that are trained in the same or a different language as the utterance are utilized to extract the referential features. For instance, some features, e.g., LU features indicating the intent of the user, are extracted based on the utterance, regardless of which items of a plurality of items are presented. In other aspects, features are extracted based on a relation between features of the utterance and features associated with the plurality of items. As discussed above, one or more feature extractors 114 may be utilized to extract the referential features from the utterance during operation 501. In particular, the one or more feature extractors 114 may be configured to extract semantic and syntactic features by considering different types of utterances (or utterance classes). In one aspect, the utterance classes may include: (1) Explicit Referential (i.e., explicit mentions of a whole or part of a title, or other textual cues such as underline text (e.g., "show me the details of the empty chair" when referring to a book title)); (2) Implicit Referential (i.e., an implicit referral of an item using information related to the item such as the name of an author or item image (e.g., "the one released in 2005")); (3) Explicit Positional (i.e., a positional reference or screen location data using information from items displayed as a grid (e.g., "I want to watch the movie on the bottom right corner")); and (4) Implicit Positional (i.e., positional references in relation to one item on the display (e.g., "the second of the director's movies" for two displayed movie items by the same director on the same row)).

At operation 502, the universal disambiguation model 150 may identify or receive referential features associated with a plurality of items. In some aspects, the referential features may be appended as metadata to each of the plurality of items. As provided above, the plurality of items may be presented on a display, presented via another medium, or accessible from an item store. Moreover, some referential features are identified (extracted) from the utterance regardless of the items presented (e.g., LU features indicating an intent of a user) and some referential features are identified (extracted) from the utterance based on a relation (e.g., degree of similarity) to features associated with one or more items. For example, for each item an inference engine (e.g., model prediction) is executed to extract the referential features. In some cases, referential features may be identified from metadata associated with an item. In further aspects, the referential features may be received or obtained from one or more feature extractors that are trained in the same or a different language from the utterance. Additionally, in some aspects, the universal model has not been trained with any training data in the same language as the utterance. In other aspects, the universal model has been trained with only a minimal amount of training data in the same language as the utterance, such 50%, 40%, 30%, 20%, 10%, or 5% or less when compared the amount of training data utilized for the feature extractor for that language.

At operation 503 the universal disambiguation model 150 may identify universal features from the obtained or received referential features. The universal features may be any features that are language and/or domain independent. For instance, based on an utterance and item relations, it can be determined which utterance is referring to which item. As such, in some aspects, at operation 503, the universal disambiguation model 150 identifies language independent features. In other aspects, at operation 503, the universal disambiguation model 150 identifies domain (or locale) independent features. In still other aspects, at operation 503, the universal disambiguation model 150 identifies a combination of language independent features and domain independent features. As discussed above, the value of a tag or the n-gram of a tag are language dependent features and therefore, may not be identified by the universal disambiguation model 150 at operation 503. However, features, such as derived semantic space, the existence of a tag, the position of the item, and/or positional references (e.g., "first one") are language and/or domain independent features and may be identified by the universal disambiguation model 150 at operation 503.

The universal disambiguation model 150 at operation 504 selects the identified universal features. As such, the universal disambiguation model 150 utilizes domain and/or language independent features to determine if the utterance in the first language is associated with one or more items. For instance, the one or more identified universal features may be selected by the model based on knowledge of both the utterance and the plurality of items. That is, a specific word/phrase from the utterance may match a word/phrase in a name or property of one or more of the plurality of items. In aspects, when a match is determined by the model, the specific universal feature may fire (e.g., be selected) during runtime.

At operation 505, where the universal disambiguation model 150 (generated or utilized by the application 130) may determine if the utterance received at operation 405 of FIG. 4 is directed to one or more specific items of the plurality of items, e.g., one or more on-screen items displayed on the display 110. In particular, the universal disambiguation model 150 may be configured to build and apply the statistical classifier model 155 to the selected universal features of the utterance and items. In some aspects, the statistical classifier model 155 may include lexical and semantic features. The lexical and semantic features may include a vocabulary obtained from text in the utterance, a phrase match between the utterance and item metadata associated with items on the display 110, and locational features (e.g., "top," "second one," etc.). If, at operation 505, the universal disambiguation model 150 determines that the utterance is directed to at least one item, e.g., of a plurality of items displayed on the display 110, then the routine 500 branches to operation 520. If, at operation 505, the universal disambiguation model 150 is unable to determine that the utterance is directed to one or more specific items (e.g., there is not a phrase match between the utterance and any of the metadata for one or more on-screen items), then the routine 500 continues to operation 510.

At operation 510, the application 130 may be configured to request a clarification of the received utterance. For example, the requested clarification may include returning a "no results" message followed by a request to restate the utterance. From operation 510, the routine 500 returns to operation 501.

At operation 520, the universal disambiguation model 150 may identify one or more items corresponding to the utterance based on the selected universal features at operation 504. In some aspects, the identified item(s) may be one or more of a plurality of items displayed on a display 110, one or more of a plurality of items presented via another medium (e.g., audio, tactile, etc.), and/or one or more of a plurality of items in an item store. In particular, the universal disambiguation model 150 may be configured to identify one or more explicit and implicit references (e.g., referential features) in the utterance, determine lexical match scores (also referred to herein as lexical overlap) between the utterance and metadata associated with each of the plurality of items, parse the utterance for matching phrases between semantic phrases in the utterance and the metadata, and parse the utterance to capture location indicators for predicting a screen location of the item. For example, the lexical match scores may be based on a lexical word match based on word overlap, word order, Jaccard-sentence similarity, etc. In some aspects, if the lexical match score for an utterance-item pair is above a threshold, then the universal disambiguation model 150 may determine that item corresponds to the utterance made by the user. In other aspects, if the lexical match score for an utterance-item pair is below a threshold, then the universal disambiguation model 150 may determine that item does not correspond to the utterance made by the user.

It should be understood, that in accordance with an aspect, the universal disambiguation model 150 may utilize a semantic parser 165 (which may comprise a natural language understanding model) to decode the utterance into semantic tags such as movie-name, actor-name, or descriptors (such as movie or game genre or description) when the universal model is trained utilizing at least some data in the same language of the utterance. Alternatively, the universal disambiguation model 150 may utilize only the semantic tags in the selected universal features. The universal disambiguation model 150 may look for matching phrases between the semantic phrases in the utterance and each item's metadata. It should be further understood, in accordance with some aspects of the disclosure, the universal disambiguation model 150 may utilize the semantic location parser 170 to parse the utterance for capturing screen location features (e.g., row and column indicators, spatial indicators such as left, right, up, down, etc.) depending on a screen layout (e.g., on a smaller display screen, such as a smartphone or handheld gaming device, the displayed items may be listed in a single column, whereas on a larger display screen, such as a laptop, tablet, desktop computer monitor or television, the displayed items may be listed on a grid structure). Once the location features of the words in the parsed utterance have been extracted, the universal disambiguation model 150 may be utilized to determine the predicted location of a displayed item.

From operation 520, the routine 500 then ends.

Accordingly, the routine (or method) 400 and/or 500 is easily scalable to new languages with minimal costs and development time. Further, routine 400 and/or 500 improves a disambiguation model's development, efficiency, and scalability by making it universal or applicable to any given language with no additional or only minimal training. Therefore, routine 400 and/or 500 provides for a NUI or a disambiguation model that is applicable to more languages and is more efficient when compared to NUIs or disambiguation models that are not designed to be universal.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
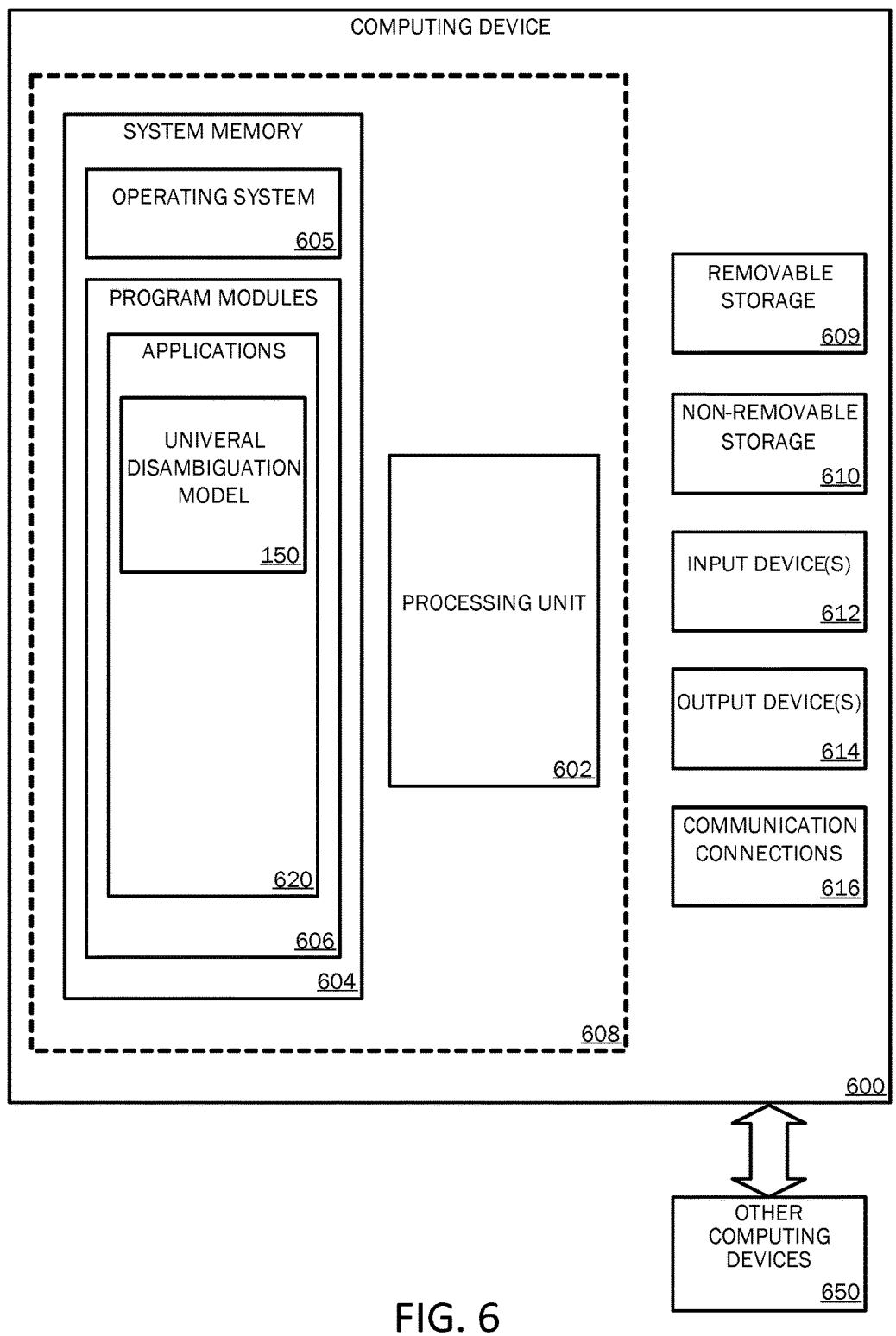
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. For example, a universal disambiguation model 150 could be implemented by the computing device 600 and/or an application 620. In some aspects, the computing device 600 is a mobile telephone, a smart phone, a tablet, a phablet, a smart watch, a wearable computer, a personal computer, a desktop computer, a gaming system, a laptop computer, and/or etc. The computing device components described below may include computer executable instructions for the NLU system that can be executed to employ the method 300 or 400 and implement portions of systems 100 or 200 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. For example, training data, extracted features, universal features and/or utterances can be stored on any of the illustrated storage devices.

As stated above, a number of program modules and data files may be stored in the system memory 604. While executing on the processing unit 602, the program modules 606 (e.g., the universal disambiguation model 150) may perform processes including, but not limited to, performing method 300 and/or method 400 as described herein. For example, the processing unit 602 may implement the universal disambiguation model 150 or applications 620. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a calendaring application, etc. In some aspects, the universal disambiguation model 150 is performed by one of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 600 may also have one or more input device(s) 612 such as a keyboard, a mouse, a pen, a microphone or other sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, RF transmitter, receiver, and/or transceiver circuitry, universal serial bus (USB), parallel, and/or serial ports.

The term computer readable media or storage media as used herein may include non-transitory computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
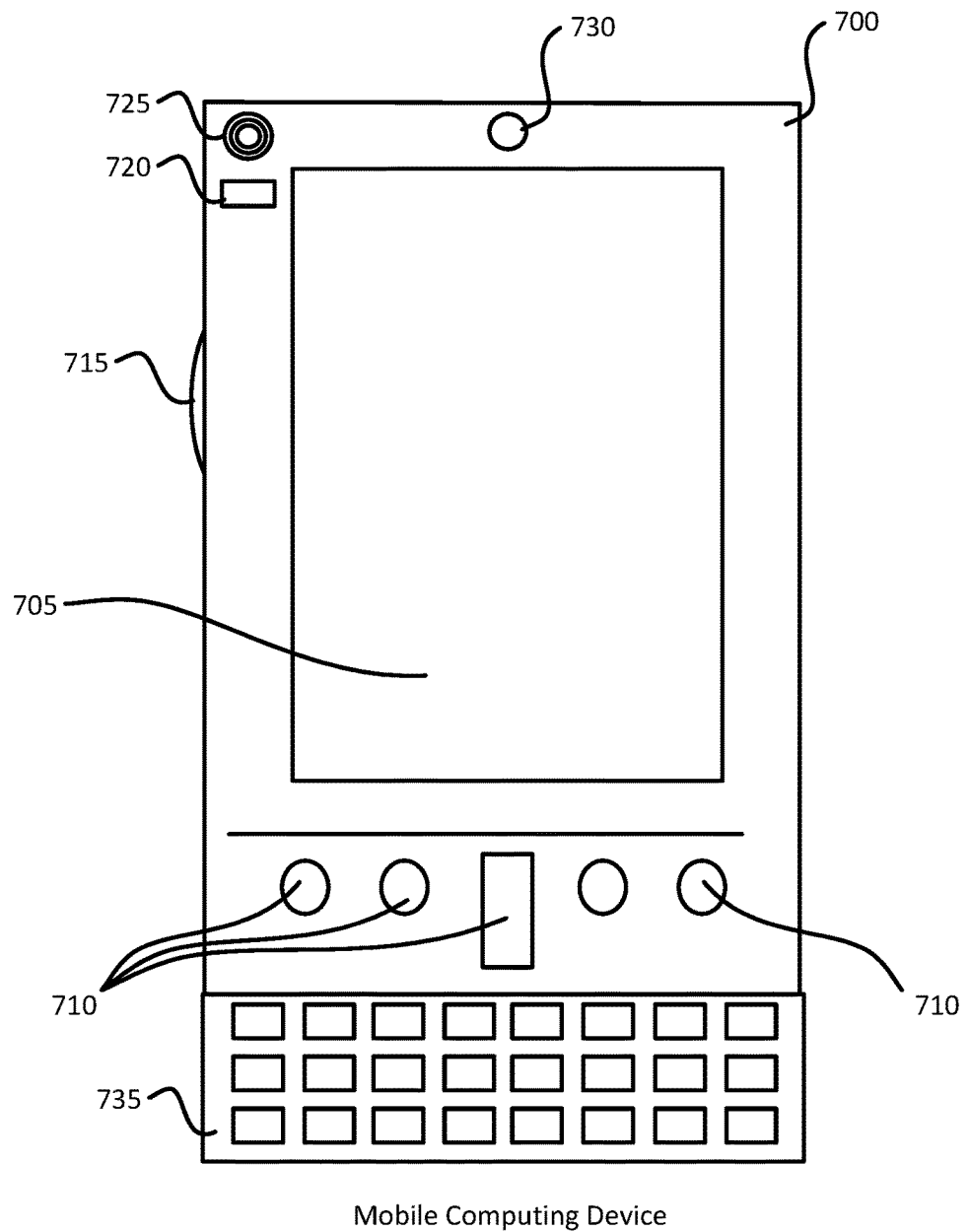
FIGS. 7A and 7B are simplified block diagrams of a mobile computing device with which aspects of the disclosure may be practiced.
Figure 7B:
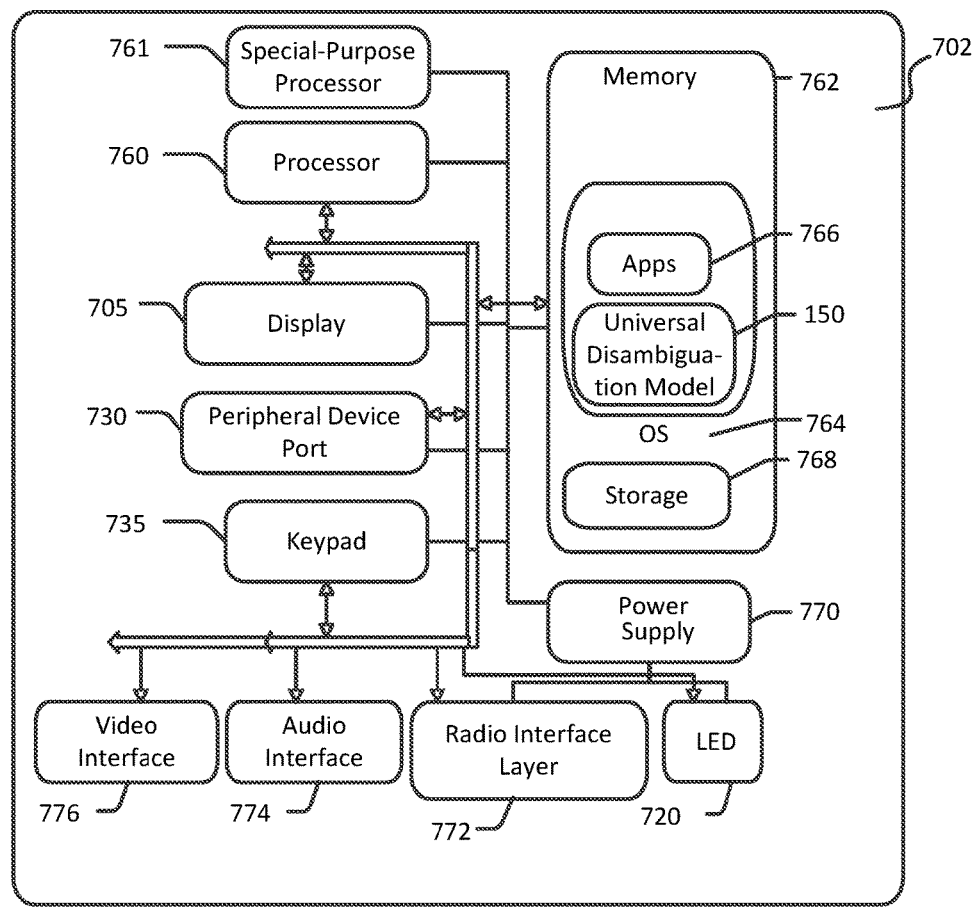

FIGS. 7A and 7B illustrate a mobile computing device 700, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 7A, one aspect of a mobile computing device 700 suitable for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display.

In addition to, or in place of a touch screen input device associated with the display 705 and/or the keypad 735, a Natural User Interface (NUI) may be incorporated in the mobile computing device 700. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 705 for showing a graphical user interface (GUI). In aspects disclosed herein, the various user information collections could be displayed on the display 705. Further output elements may include a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one aspect, the system 702 is implemented as a "smart phone" capable of running one or more applications (e.g., browser, e-mail, calendaring, contact managers, messaging clients, games, and media clients/players).

In some aspects, the system 702 is integrated as a computing device, such as an integrated personal digital assistant (PDA) and wireless phone.

One or more application programs 766 and/or a universal disambiguation model 150 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated aspect, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
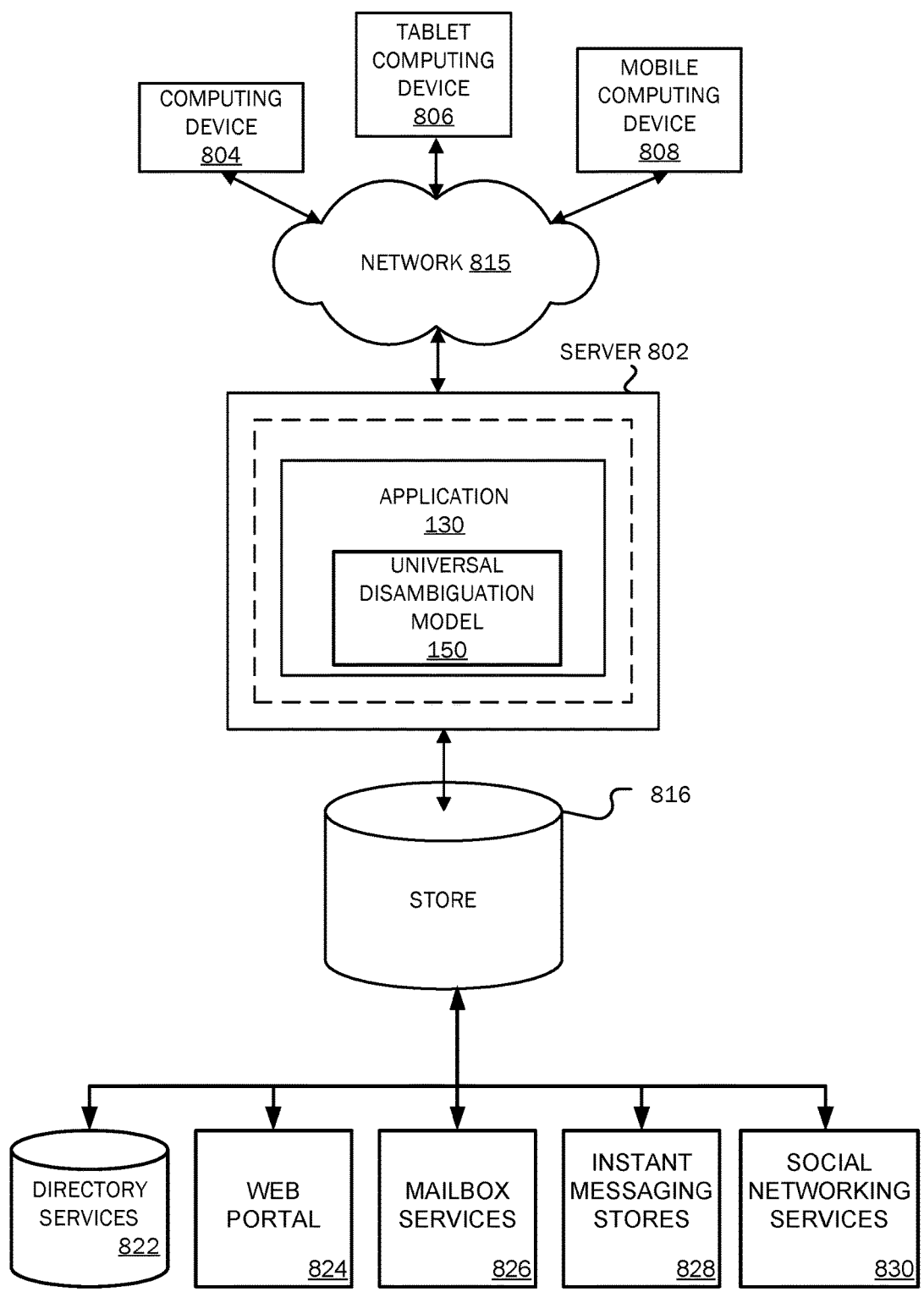
FIG. 8 is a simplified block diagram of a distributed computing system in which various aspects of the disclosure may be practiced.

FIG. 8 illustrates one aspect of the architecture of a system for processing data received at a computing system from a remote source, such as a general computing device 804, tablet 806, or mobile device 808, as described above. Content displayed at server device 802 may be stored in different communication channels or other storage types. For example, various documents may be stored using a directory service 822, a web portal 824, a mailbox service 826, an instant messaging store 828, or a social networking site 830. By way of example, a universal disambiguation model 150 may be implemented in a general computing device 804, a tablet computing device 806 and/or a mobile computing device 808 (e.g., a smart phone). In other aspects, the server 802 is configured to implement universal disambiguation model 150 for application 130, via the network 815.

Figure 9:
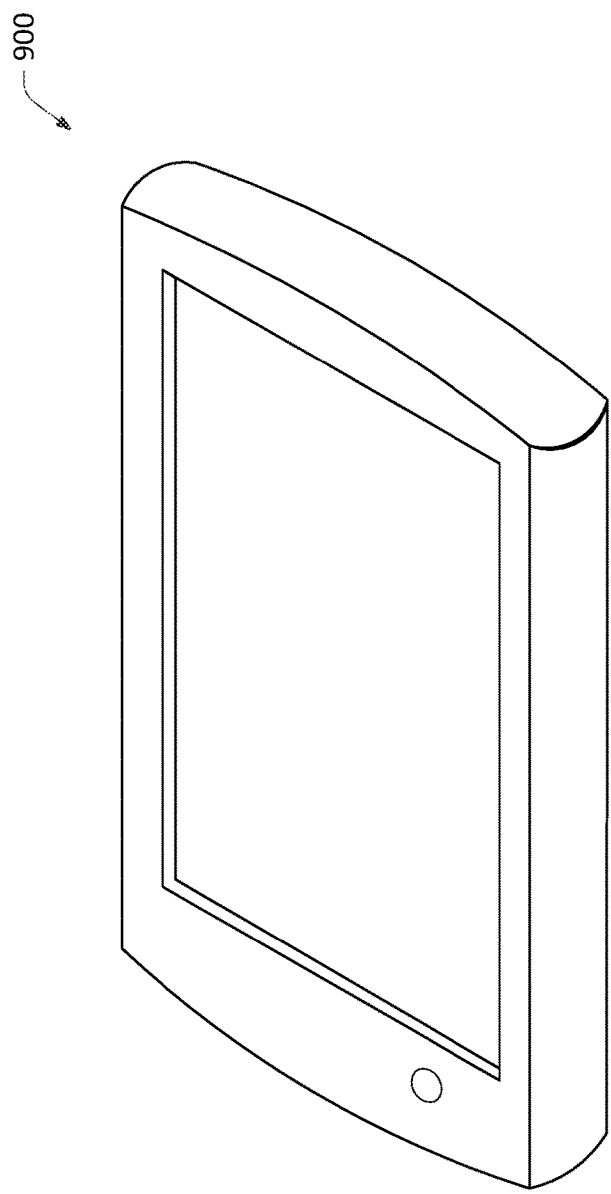
FIG. 9 illustrates a tablet computing device with which aspects of the disclosure may be practiced.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In an aspect, a computing device is provided including at least one processor and a memory for storing and encoding computer executable instructions that, when executed by the at least one processor are operative to cause the computing device to receive an utterance. For example, the computer executable instructions may further cause the computing device to extract features from the utterance to form extracted features. The computer executable instructions may further cause the computing device to identify that the utterance is directed to at least one of the plurality of items utilizing a language independent disambiguation model, wherein the language independent disambiguation model identifies that the utterance is directed to the at least one of the plurality of items by: identifying as universal features one or more domain independent features and language independent features in the extracted features; determining an overlap between one or more universal features extracted from the utterance and one or more features associated with the plurality of items; and identifying the at least one of the plurality of items corresponding to the utterance based on the overlap. The computer executable instructions may further cause the computing device to send instructions to perform an action associated with the utterance upon identifying that the utterance is directed to the at least one of the plurality of items.

In further regard to the aspect described above, the utterance is received in a first language and the language independent disambiguation model is trained utilizing data from a different language from the first language. In some cases, the plurality of items is presented on a display. In further examples, extracting the features from the utterance further include determining one or more relations between features of the utterance and features associated with one or more of the plurality of items and extracting the features from the utterance having a relation to one or more features associated with one or more items of the plurality of items. The features associated with each of the plurality of items may be identified from metadata associated with each of the plurality of items. Additionally, determining the overlap may further include the computing device determining a lexical overlap between a word or phrase of the utterance and a word or phrase in a title or property of the at least one of the plurality of items. For example, when the plurality of items is presented on a display, determining the lexical overlap may include one or more of: identifying an explicit reference to the at least one item based on a portion of text in the utterance; identifying an explicit reference to the at least one item based on a textual cue in the utterance; identifying an explicit reference to the at least one item based on screen location data in the utterance, identifying an implicit reference to the at least one item based on the utterance; and identifying an implicit reference to a position of the at least one item based on the utterance.

In further aspects of the above example, where the plurality of items is presented on a display, determining the overlap may include the computing device building a statistical classifier model comprising lexical and semantic features, the lexical and semantic features may include, for example, a match between the utterance and metadata associated with one or more of the plurality of items on the display or a match between the utterance and locational features associated with one or more of the plurality of items on the display. In still further aspects, where the plurality of items is presented on a display, determining the overlap may include the computing device determining a plurality of match scores between the universal features extracted from the utterance and the features associated with one or more of the plurality of items on the display; parsing the utterance for matching phrases between semantic words or phrases in the utterance and words or phrases in a title or property of the at least one of the plurality of items; and parsing the utterance to capture location indicators for predicting a screen location of the at least one item of the plurality of items. As should be appreciated, any combination of the above steps may be utilized to identify at least one item corresponding to a received utterance.

In another aspect, a method is provided. The method includes displaying a plurality of items on a display and receiving, by a computing device, an utterance in a first language in response to the displaying the plurality of items. The method further includes extracting, by the computing device, features from the utterance having a relation to features associated with one or more of the plurality of items to form extracted features. The method further includes identifying, by the computing device, that the utterance is directed to at least one of the plurality of items on the display by utilizing a language independent disambiguation model. In examples, the language independent disambiguation model is trained with data from a second language. The language independent disambiguation model identifies that the utterance is directed to the at least one of the plurality of items on the display by identifying domain and language independent features in the extracted features; selecting the domain and language independent features from the extracted features to form selected features; determining an overlap between the selected features extracted from the utterance and the features associated with one or more of the plurality of items on the display; and identifying that the at least one of the plurality of items on the display corresponds to the utterance based on the overlap. The method further involves performing, by the computing device, an action associated with the utterance in response to identifying that the utterance is directed to the at least one of the plurality of items on the display. As should be appreciated, any combination of the above steps may be utilized to identify at least one item corresponding to a received utterance.

In yet another aspect, a computer readable storage medium is provided. The computer readable storage medium stores computer executable instructions which, when executed by a computing device, cause the computing device to perform a method. For example, the computer executable instructions may cause the computing device to send instructions to present a plurality of items and receive an utterance in a first language. The computer executable instructions may cause the computing device to extract features from the utterance utilizing a language understanding model to form extracted features and to determine that the utterance is directed to at least one of the plurality of items by utilizing a language independent flexible item selection model. In examples, the language independent flexible item selection model has not received training data for the first language. The language independent flexible item selection model determines that the utterance is directed to the at least one of the plurality of items by identifying as universal features one or more domain independent features and language independent features in the extracted features and determining a lexical overlap between one or more universal features extracted from the utterance and one or more features associated with the at least one of the plurality of items. The computer executable instructions may cause the computing device to send instructions to perform an action associated with the utterance upon determining that the utterance is directed to the at least one item among the plurality of items. As should be appreciated, any combination of the above steps may be utilized to identify at least one item corresponding to a received utterance.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some aspects of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

Various embodiments and/or examples are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The embodiments, examples, and details provided in this application are considered sufficient to convey possession and enable others to make and use the best mode of claimed disclosure. The claims should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claims.

What is claimed is:

1. A computing device comprising:
   at least one processor; and
   a memory for storing and encoding computer executable instructions that, when executed by the at least one processor are operative to:
      receive an utterance from a user;
      extract features from the utterance to form extracted features;
      identify that the utterance is directed to at least one of a plurality of items previously provided by the computing device to the user utilizing a language independent disambiguation model, wherein the language independent disambiguation model identifies that the utterance is directed to the at least one of the plurality of items by:
         identifying as universal features one or more domain independent features and language independent features in the extracted features;
         determining an overlap between one or more universal features extracted from the utterance and one or more features associated with the plurality of items, wherein the one or more features are identified based on metadata associated with the plurality of items; and
         identifying the at least one of the plurality of items corresponding to the utterance based on the overlap; and
      send instructions to perform an action associated with the utterance upon identifying that the utterance is directed to the at least one of the plurality of items.

2. The computing device of claim 1, wherein the utterance is in a first language, and wherein the language independent disambiguation model is trained utilizing data from a different language from the first language.

3. The computing device of claim 1, wherein the plurality of items is provided by being presented on a display.

4. The computing device of claim 1, wherein features associated with each of the plurality of items are identified from metadata associated with each of the plurality of items.

5. The computing device of claim 1, wherein extracting the features from the utterance further comprises:
   determining one or more relations between features of the utterance and features associated with one or more of the plurality of items; and
   extracting the features from the utterance having a relation to the one or more features associated with one or more items of the plurality of items.

6. The computing device of claim 5, wherein a plurality of language understanding models are utilized to extract the features from the utterance having the relation to the one or more features associated with the one or more items of the plurality of items, and wherein each of the plurality of language understanding models is trained utilizing data from a different language.

7. The computing device of claim 6, wherein the utterance is in a first language that is different from any languages utilized to train the plurality of language understanding models.

8. The computing device of claim 1, wherein determining the overlap further comprises:
   determining a lexical overlap between at least one word of the utterance and at least one word in a title or property of the at least one of the plurality of items.

9. The computing device of claim 1, wherein the plurality of items is presented on a display, and wherein determining the overlap further comprises:
   building a statistical classifier model comprising lexical and semantic features, the lexical and semantic features comprising one or more of the following: a match between the utterance and metadata associated with one or more of the plurality of items on the display and a match between the utterance and locational features associated with one or more of the plurality of items on the display; and
   applying the statistical classifier model to the utterance.

10. The computing device of claim 8, wherein determining the lexical overlap further comprises one or more of:
    identifying an explicit reference to the at least one item based on a portion of text in the utterance;
    identifying an explicit reference to the at least one item based on a textual cue in the utterance; and
    identifying an explicit reference to the at least one item based on screen location data in the utterance.

11. The computing device of claim 8, wherein determining the lexical overlap further comprises:
    identifying an implicit reference to the at least one item based on the utterance; and
    identifying an implicit reference to a position of the at least one item based on the utterance.

12. The computing device of claim 1, wherein the plurality of items is presented on a display, and wherein determining the overlap further comprises:
    determining a plurality of match scores between the universal features extracted from the utterance and the features associated with one or more of the plurality of items on the display;
    parsing the utterance for matching phrases between semantic words or phrases in the utterance and words or phrases in a title or property of the at least one of the plurality of items; and
    parsing the utterance to capture location indicators for predicting a screen location of the at least one item of the plurality of items.

13. The computing device of claim 1, wherein the action comprises:
    selecting the at least one item; and
    providing additional information about the selected at least one item.

14. The computing device of claim 1, wherein the action comprises:
selecting the at least one item; and
executing an activity associated with the selected at least one item.

15. The computing device of claim 1, wherein the language independent disambiguation model is trained for a specific application, wherein the specific application is at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
an exchange application; and
a calendaring application.

16. A method comprising:
displaying a plurality of items on a display;
receiving, by a computing device, an utterance in a first language in response to the displaying the plurality of items;
extracting, by the computing device, features from the utterance having a relation to features associated with one or more of the plurality of items to form extracted features;
identifying, by the computing device, that the utterance is directed to at least one of the plurality of items on the display utilizing a language independent disambiguation model,
wherein the language independent disambiguation model is trained with data from a second language and does not require any training data from the first language, and
wherein the language independent disambiguation model identifies that the utterance is directed to the at least one of the plurality of items on the display by:
identifying domain and language independent features in the extracted features;
selecting the domain and language independent features from the extracted features to form selected features;
determining an overlap between the selected features extracted from the utterance and the features associated with one or more of the plurality of items on the display; and
identifying that the at least one of the plurality of items on the display corresponds to the utterance based on the overlap; and
performing, by the computing device, an action associated with the utterance in response to identifying that the utterance is directed to the at least one of the plurality of items on the display.

17. The method of claim 16, wherein the first language is different than the second language.

18. The method of claim 16, wherein determining the overlap comprises:
determining a lexical overlap between at least one of the selected features extracted from the utterance and at least one of the features associated with the at least one of the plurality of items on the display.

19. The method of claim 16, wherein the computing device is at least one of:
a mobile telephone;
a smart phone;
a tablet;
a smart watch;
a wearable computer;
a personal computer;
a desktop computer;
a gaming system; and
a laptop computer.

20. A computer readable storage device storing computer executable instructions which, when executed by a computing device, cause the computing device to perform a method comprising:
sending instructions to present a plurality of items;
receiving, by the computing device, an utterance in a first language;
extracting, by the computing device, features from the utterance utilizing a language understanding model to form extracted features; determining, by the computing device, that the utterance is directed to at least one of the plurality of items by utilizing a language independent flexible item selection model,
wherein the language independent flexible item selection model has not received training data for the first language,
wherein the language independent flexible item selection model determines that the utterance is directed to the at least one of the plurality of items by:
identifying as universal features one or more domain independent features and language independent features in the extracted features; and
determining a lexical overlap between one or more universal features extracted from the utterance and one or more features associated with the at least one of the plurality of items; and
sending instructions to perform an action associated with the utterance upon determining that the utterance is directed to the at least one item among the plurality of items.

* * * * *